Figure 1:
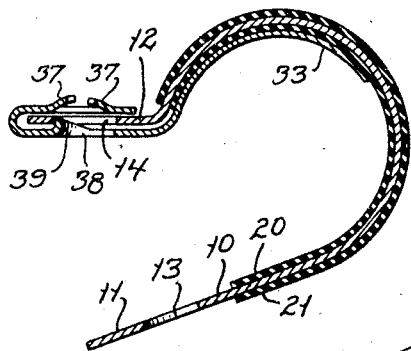

Dec. 9, 1947.  G. A. TINNERMAN  2,432,492
COMBINED NUT FASTENER AND GROUNDING MEMBER
Original Filed May 9, 1942

INVENTOR.
George A. Tinnerman,
BY Bates, Teare & McBean
Attorneys.

Patented Dec. 9, 1947

2,432,492

UNITED STATES PATENT OFFICE 2,432,492

COMBINED NUT FASTENER AND GROUNDING MEMBER

George A. Tinnerman, Cleveland, Ohio, assignor to Tinnerman Products, Inc., Cleveland, Ohio, a corporation of Ohio Original application May 9, 1942, Serial No. 442,335. Divided and this application November 14, 1942, Serial No. 465,557

1 Claim. (Cl. 174—40)

This invention relates to a fastening device and grounding member adapted to embrace a conduit or pipe and be readily attachable to a support to position the conduit. One of the objects of the invention is to provide such a fastening device and grounding member which may be cheaply constructed and attached in a very quick and simple manner, merely by the application of a screw passing through the support, the fastening device itself forming a nut for the screw and avoiding the necessity of a wrench.

The present application, which is a division of my copending application No. 442,335, filed May 9, 1942, which has matured to Patent No. 2,382,678 dated August 14, 1945, for a fastening device, relates particularly to an embracing clamp having a yielding cushion on the inner face thereof and having a metallic connection with the conduit, causing the latter to be electrically grounded through the support, notwithstanding the insulating character of the cushion. To that end the fastening device is provided with an arcuate metallic arm which underlies the cushion and contacts with the conduit.

The present invention is more fully described in connection with preferred embodiments thereof illustrated in the drawings. Various advantageous features of the invention will be apparent from such description.

Figure 2:
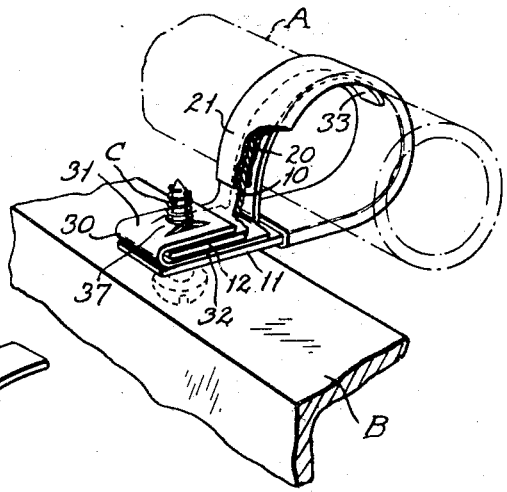
Figure 3:
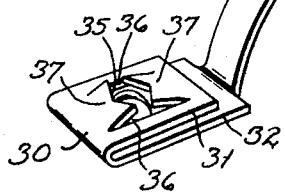
Figures 4, 5:
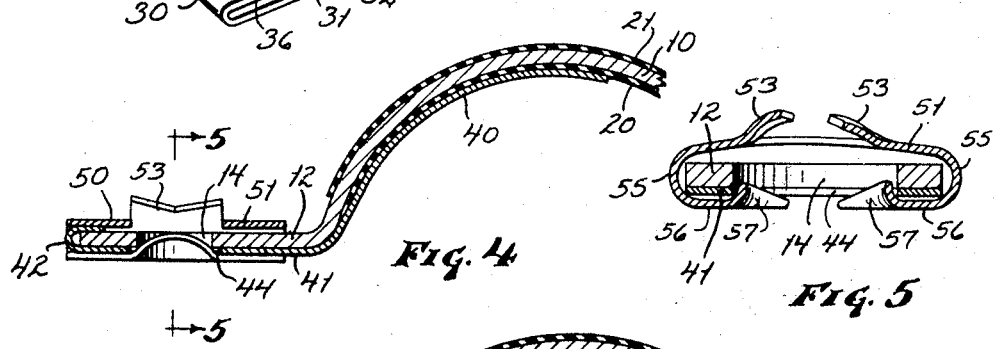
Figure 6:
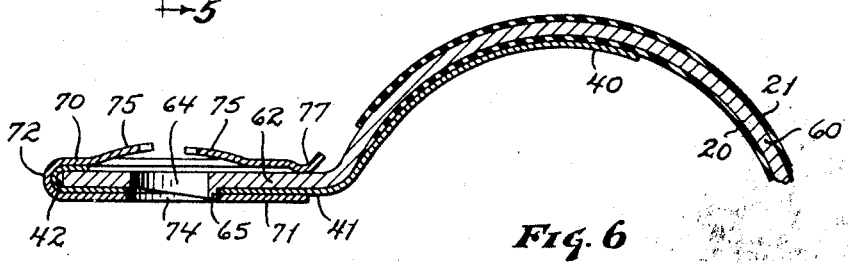
Figure 7:
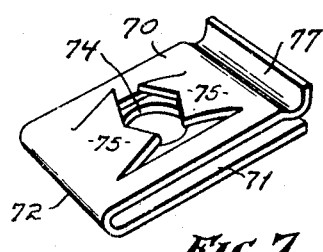

In the drawings, Fig. 1 is a sectional view of one form of my cushioned clamp in its normal condition ready for application; Fig. 2 is a perspective of this embodiment applied to a suitable support embracing a conduit indicated in broken lines; Fig. 3 is a perspective of the screw engaging clip with integral arcuate tongue employed in the embodiment of Fig. 1; Fig. 4 is a fragmentary section of another form of conduit clamp embodying my invention; Fig. 5 is a cross section in the plane indicated by the line 5—5 in Fig. 4; Fig. 6 is a fragmentary view of still another form of conduit clamp embodying my invention; Fig. 7 is a perspective of the fastening clip employed in the construction of Fig. 6.

In each of the embodiments, 10 indicates a strap or band, preferably of metal, looped on itself into arcuate form for something over half a complete circumference and terminating in two extreme arms, one of which, designated 11, preferably leads tangentially from the curved portion of the strap, and the other of which, designated 12, diverges abruptly from the strap, at approximately right angles to the adjacent portion thereof. Round openings 13 and 14 are formed in these two arms, through which the fastening screw may pass, as hereinafter described.

On the inner face of the loop 10 is a cushion 20 which may be a flattened tube of rubber or insulating material enveloping the loop, the outer layer of this tube being designated 21 in the drawings.

When the arms 11 and 12 are brought together, or almost together, a substantially cylindrical space is confined by the strap and thus the strap when applied may snugly embrace a conduit or pipe with a cushioned effect. This is illustrated in Fig. 2, wherein A indicates the conduit; B a suitable support in the form of an angle bar or bracket, and C the fastening screw.

In each embodiment, I apply to the abrupt arm 12 of the clamp a separate fastening clip which embraces the arm and has thread-engaging means to coact with the thread of the attaching screw.

In the form shown in Figs. 1, 2 and 3, the separate clip designated 30, comprises a strip of metal doubled on itself to produce two spaced portions 31 and 32 adapted to embrace the arm 12, and there is an arcuate extension 33 of the lower portion adapted to lie against the inner face of the yielding layer 20 and thus contact with the metallic conduit to conduct static electricity away from the conduit.

As above pointed out, the clip in this embodiment has three integral connected portions, namely, the top member 31, the bottom member 32, and the arcuate arm 33. The top member 31 has an opening 35 and parallel slits 36 to provide two tongues 37 bent up at an oblique angle, and warped, as in Fig. 1. This top member 31 by its bent over end continues as the parallel bottom member 32. This bottom member has an opening 38 with an upturned flange having an inclined top 39 on its outer margin. At its inner edge the bottom member continues as the arcuate portion 33, which is preferably narrow and extends for something less than a semi-circumference. The upstanding flange 39 is formed about that half of the hole 38 which is on the side toward the bend. This gives an abrupt shoulder adjacent the bend with an incline gradually leading to the shoulder.

When the parts in Fig. 1 are being assembled, the abrupt arm 12 of the clamp is shoved into the opening between the two layers 31 and 32 of the clip in a direction toward the bend. This enables the extreme end of the clamp arm to slide up on the inclined top of the lug 39, spring over that top, the lug thus entering the hole 14 of the clamp arm, thereby retaining the clip on the clamp, with the arcuate arm 33 of the clip lying snugly against the inner layer 20 of the yielding covering.

When the conduit is embraced by the clamp, as shown in Fig. 2, the retaining screw C is passed through the support and the opening 13 of the tangential arm 11; thence through the opening 38 of the clip; thence the opening 14 of the clamp and finally receiving its nut by the inclined struts 37. When so applied the arcuate tongue 33 contacts tightly with the surface of the conduit and thus serves to ground the same to the frame carrying the support. At the same time, the clamping action is cushioned by the yielding layer 20.

In Figs. 4 and 5, a modified form of automatically grounding fastening device is shown. Here the arcuate metallic member is separate from the clip but is retained by the clip against the clamping member. In this embodiment, the clamping member itself is the same as in Fig. 1, having the loop 10 with the abrupt arm 12 having the opening 14, and there are the same inner and outer elastic layers 20 and 21. The grounding member comprises an arcuate strip 40 having a flat arm 41 adapted to lie snugly against the under face of the arm 12 and provided at its end with a turned over portion 42 so that it may engage the upper face of the arm 12. The flat portion 41 has an opening 44 at least as great as the opening 14 with which it registers.

The clip 50 in this embodiment of Figs. 4 and 5 has a top plate-like portion 51 with an opening between two raised oblique tongues 53; has bent-over edges or side portions 55; and has two bottom portions 56 each with an upturned lip 57 wtih an inclined top. When such clip is shoved into place over the end of the arm 12, against which the grounding strip is mounted, the inclined lips 57 slide under the grounding strip and spring back into place through the opening 44 of that strip into the opening 14 of the arm 12, as shown particularly in Fig. 5.

Figs. 6 and 7 illustrate still another embodiment of a grounded clamp having a clip applied thereto. In this embodiment the looping portion 60 of the clamp has a specially formed abrupt arm 62 provided not only with the hole 64 but with a depending flange 65 about the hole which is cut away on an incline on the underside. The incline is greatest in the region of the flange nearest the arcuate arm, merging with the bottom plane of the flat arm 62 adjacent the point of the hole 64 farthest from the arcuate arm.

The arcuate arm carries the inner and outer layers 20 and 21 of yielding material similar to the forms of Figs. 1 and 4. The grounding arm is the same as that of Fig. 4, comprising the arcuate portion 40 lying against the inner member layer 20 and the flat arm 41 and the bent-over end portion 42 which comes onto the top of the clamp arm 62.

The retaining clip of the embodiment of Figs. 6 and 7 is somewhat different from that shown in either of the other figures. It comprises the top plate 70, the bottom plate 71 integrally connected by a bent-over end 72. The bottom plate has a round hole 74 through it. The top plate is formed with a hexagonal hole and a pair of parallel slits producing two tongues 75 with V-shaped ends, which were bent up obliquely and oppositely warped, as in various other embodiments. The free end of the top plate of this clip is bent first downwardly and then upwardly to produce a beaded edge adapted to have a spring engagement with the clamp arm.

In the assembled parts shown in Figs. 6 and 7, the grounding strip is first hooked over the end of the clamp arm 62 and brought tightly against the inner face of the clamp so that the arcuate lug 65 extends through the opening of the grounding strip and beyond it. Then the clip is shoved lengthwise of itself over the end of the clamp arm and grounding strip. In this operation, the lower arm 71 of the clip is cammed downwardly by the incline 65 and then springs up into place beyond it; snugly engaging the under face of the arm 41 of the grounding member. At the same time the bead extension 77 on the end of the upper arm of the clip bears down snugly on the upper face of the clamp arm 62. The parts are thus firmly retained in mutual position.

It will be seen that in all the different embodiments in my invention I have provided a loop adapted to embrace a conduit or pipe with a cushioning effect, the loop having two projecting arms with openings through them and I have mounted on one of these arms a screw retainer in the form of a clip embracing the arm and retained in place by inter-engaging shoulders on the clip and arm. In each case, one face of this clip is formed with an opening for the passage of the screw and the other face with a pair of opposed inclined warped tongues having V-shaped notches such distance apart as to snugly engage in the thread with a screw passed through the openings in the arms. The inter-engaging shoulders mentioned are provided by an opening in the clamp arm or in the clip and a flange with an inclined face on the other member, so that the clip may be slid onto the clamp arm and when located will spring into place, the inclined flange of one of the members occupying the hole of the other. The loop is thus provided with a retaining device which provides for the passage of the fastening screw and provides oblique spring tongues acting as the nut for that screw. The application of the clip holds the arcuate grounding arm snugly against the cushioning layer, whether the arcuate arm is integral with the clip or clamped in place by it.

It will be understood from the description given that the clip of this invention may be very quickly mounted on the clamp arm, and is readily adapted for use on present manufactures of cushioning loops. When the loop is equipped with the clip and grounding arm of this invention, it provides for the clamping and grounding of the conduit with the maximum speed. Separate nuts and wrenches are avoided, the only tool necessary being a screwdriver. Moreover, the spring action of the clip tongues locks the screw effectively in place so that no nut lock is necessary.

Reference is made to my copending application No. 476,219, filed February 17, 1943 (which is a division of my previously mentioned parent application No. 442,335) for claims on the fastening clip per se illustrated herein in Figs. 4 and 5.

Application No. 476,219 has become Patent No. 2,336,319 dated December 7, 1943.

I claim:

In an electrical clamp for securing an element to be grounded, said clamp comprising a metal band in the form of a loop having a cushioning layer on the inner surface thereof and free ends having openings adapted to be aligned for receiving a bolt or screw to secure the clamp, a one-piece combined nut fastener and grounding member comprising a sheet metal body having a return bent end defining outer and inner portions embracing a free end of the clamp and attached thereto and provided with openings in registration with the opening in said free end of the clamp, bolt or screw thread engaging means carried by said outer portion, and an integral bonding extension carried by said inner portion extending in underlying relation to said cushioning layer on the clamp for engaging the element to be grounded.

GEORGE A. TINNERMAN.

REFERENCES CITED

The following references are of record in the file of this patent:

UNITED STATES PATENTS

| Number | Name | Date |
| --- | --- | --- |
| 2,101,287 | Tinnerman | Dec. 7, 1937 |
| 2,279,866 | Ellinwood | Apr. 14, 1942 |
| 2,298,560 | Harrison | Oct. 13, 1942 |
| 2,397,253 | Ellinwood | Mar. 26, 1946 |

OTHER REFERENCES

"Engineering Data and Specifications," of "Bendix Thermo-Welded Cushion-Clamps and Army-Navy Tube Clamps," book No. 297 issued by Bendix Aviation, Ltd., North Hollywood, California; pages IV-1A and IV-2A, both dated Dec. 10, 1941, and received in Div. 65 U. S. Patent Office May 20, 1942.